United States Patent

[11] 3,575,063

| [72] | Inventor | Harley Harrom<br>Excelsior, Minn. |
|---|---|---|
| [21] | Appl. No. | 796,763 |
| [22] | Filed | Feb. 5, 1969 |
| [45] | Patented | Apr. 13, 1971 |
| [73] | Assignee | White Farm Equipment Company |

[54] COWL-MOUNTED PEDAL ARRANGEMENT
10 Claims, 4 Drawing Figs.

[52] U.S. Cl. ................................................. 74/512,
192/4, 192/13
[51] Int. Cl. .................................................... G05g 1/14
[50] Field of Search ........................................ 74/512,
560; 192/4 (A), 13

[56] References Cited
UNITED STATES PATENTS

| 2,869,392 | 1/1959 | Mueller | 74/512 |
| 2,884,803 | 5/1959 | Willis | 74/512 |
| 2,917,143 | 12/1959 | Jenney | 192/4(A)X |
| 3,027,778 | 4/1962 | Risnes | 74/512 |
| 3,050,165 | 8/1962 | Day et al. | 192/13 |
| 3,181,667 | 5/1965 | Lohbauer et al. | 192/4(A)X |

Primary Examiner—Fred C. Mattern, Jr.
Assistant Examiner—F. D. Shoemaker
Attorney—Watts, Hoffmann, Fisher & Heinke ABSTRACT: A foot-operated pedal assembly with combined mounting incorporating a master cylinder which attaches as a unit to the cowl of a vehicle, especially a lift truck.

INVENTOR.
HARLEY A. HARROM
ATTORNEYS.

Patented April 13, 1971

INVENTOR.
HARLEY A. HARROM

BY Watts, Hoffmann
Fisher & Heinke
ATTORNEYS.

COWL-MOUNTED PEDAL ARRANGEMENT

BACKGROUND OF THE INVENTION

A common form of industrial lift truck comprises a truck or tractor having a load-lifting structure mounted on the front end including an extensible mast assembly and a load-lifting carriage vertically movable on the mast assembly. The truck engine is mounted in the rear beneath the operator. The front wheels are driven and the rear wheels are steerable. The operator faces to the front and sits in an open cab having a front cowl structure upon which hydraulic lift control levers and instruments are mounted. A steering column supports a steering wheel which is situated approximately in the operator's lap. The front cowl structure which defines a small enclosure for the operator's feet houses a foot-operated pedal assembly which controls the vehicle's functions such as braking, clutching or combined braking and clutching sometimes referred to as inching control where there is a power shift transmission and fluid-operated clutch.

1. Field of the Invention

While the invention will be described with particular reference to a lift truck braking and inching control pedal, it should be understood that it includes a certain arrangement of parts and combinations which are new and novel in and of themselves such that the pedal arrangement of the invention may be equally well suited for other foot-operated controls and in other types of vehicles.

2. Description of the Prior Art

A floor plate extends beneath the operator's feet which in prior art lift trucks is provided with openings through which project pedal linkages for operating the clutch and brake.

Lift trucks which have a fluid clutch or power shift transmission do not have a clutch pedal as such but may have an inching control pedal connected to a linkage leading to an inching control valve which can function to maintain the fluid-operated clutch partially engaged while the brake is also partially engaged as determined by the positioning of a valve spool controlling the degree of hydraulic pressure on the clutch. The pedal arrangement is usually such that the stroke of the inching control pedal is phased with the normal master cylinder requirement for energizing the hydraulic brakes so that the clutch is completely disengaged and the brakes engaged or vice versa with an overlapping zone in between for inching control. This is advantageous when it is desirable to have the truck creep or inch such as through a narrow passageway.

In lift trucks the engine and power train are usually in the rear. Thus relatively long pedal linkages are required. Commonly the master cylinder is installed at a location remote from the brake pedal. The customary disadvantage to such an arrangement is not only that the master cylinder requires separate mounting and access provisions for level support and to resupply hydraulic fluid, but in addition there is the assembly time involved in fitting together the brake linkages, brake return spring and connecting up the master cylinder piston.

In dual pedal arrangements where the operator has duplicate control pedals for the left and right foot, the linkage is further complicated by separate mountings and added linkage rods.

SUMMARY OF THE INVENTION

The invention has as one of its advantages a brake system in which a master cylinder, operating linkage and brake return spring are an associative part of a combined pedal mounting adapted to be installed as a unit in the vehicle cab or cowl.

The invention features a pedal mounting which includes a rotatable crank arm connected to the brake pedal and operating the piston of the master cylinder. A portion of the pedal mounting is effective for supporting the master cylinder in juxtaposition to the crank arm and a brake return spring is connected to the arm for returning the master cylinder piston and brake pedal to the rest position.

A further advantage of the invention is that the pedal mounting is especially adapted for installation in the cowl of a lift truck where space limitations are a factor and to this end, the mounting is a compact assembly utilizing interchangeable parts adapting it for use with lift trucks employing mechanical clutches as well as fluid clutches.

Where a pedal mounting is provided for use with a lift truck having a fluid clutch and inching control function, there is a common one-peice pedal which may be rotated on the pedal shaft with either the left or right foot of the operator. A link pivoted on the shaft controls an inching control valve in phased relationship with the normal stroke of the master cylinder.

Where the pedal mounting is used on a truck having a mechanical clutch, the one-piece pedal is substituted by two pedals on the common shaft for the brake and the other for the clutch pedal.

Another feature involves installation insuring that the master cylinder is level where the pedal mounting has a rear surface the inclination of which is complementary to the inclination of the interior wall of the cowl so as to orient the crank arm and master cylinder in a vertical position.

The invention further resides in certain novel features of construction in combination with the arrangement of parts wherein further objects, features and advantages will be apparent to those skilled in the art to which the invention pertains from the following description of the preferred embodiment. Specifically, in carrying out the invention, a pedal mounting comprises a U-shaped bracket having parallel legs joined at the back and between which there extends a fixed shaft. A pedal is journaled on the fixed shaft. A crank arm is rotated by a dog on the pedal in a direction transversely of the direction of movement of the dog when the pedal is depressed by the operator. A connecting rod is coupled to the crank arm for operating a master cylinder which has a special mounting extension provided for it on the U-shaped bracket. A brake return spring is anchored at one end and connected at the other to the crank arm for returning the master cylinder and pedal to the brake-disengaging position.

These and other objects and advantages will be more apparent by referring to the following description and drawings wherein.

While the foot-operated pedal mounting of the preferred embodiment as shown and described herein is especially adapted for use with industrial lift trucks, it is to be understood that the description which follows is in no way intended to limit application of the invention to lift trucks and may be used in any vehicle.

Figure 1:
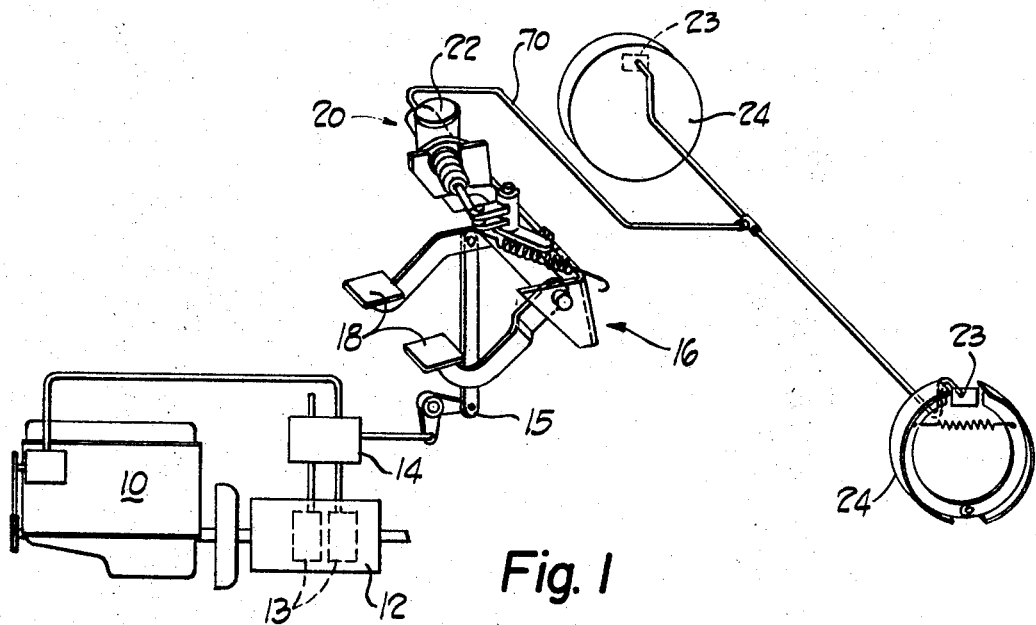
FIG. 1 is a schematic diagram of a hydraulic brake and inching control system for a lift truck employing a pedal mounting constructed in accordance with the invention.

Referring now to FIG. 1, a lift truck includes an engine 10 which supplies power to wheels (not shown) through a power shift transmission 12 controlled by fluid-operated clutches 13. An inching control valve 14 is connected by a linkage 15 to a combined inching and braking pedal mounting 16 installed in the cab of the truck having pedals 18 accessible to the operator's feet. A brake system 20 includes a master cylinder 22 which operates wheel cylinder 23 for actuating wheel brakes 24.

Figure 4:
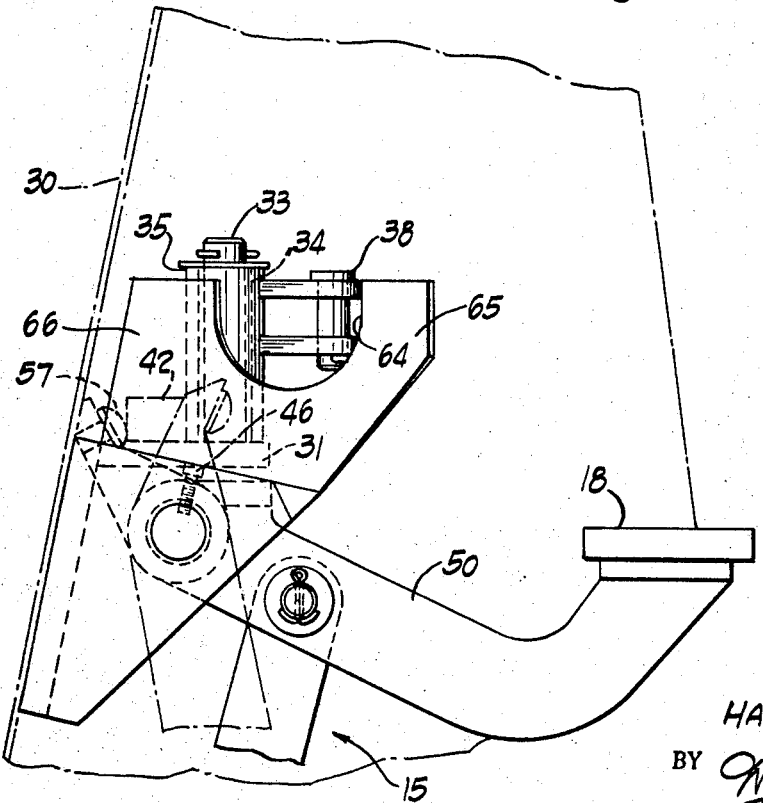
FIG. 4 is a side elevational view of the mounting shown with the master cylinder dismounted.

Now in more detail, the pedal mounting 16 includes a bracket 25 having a U-shaped configuration providing parallel legs 26, 27 joined at the back by a web 28 provided with mounting slots 29 adapted to receive fasteners for attaching the entire assembly to the vehicle cowl structure 30, a portion of which is shown in FIG. 4. A portion 31 of the mounting bracket 25 extends inwardly and horizontally from the web 28 providing a generally rectangular area which has a shaft 33 mounted thereon which extends vertically approximately midway between the pedals 18. The shaft 33 has a bushing 34 upon which a crank arm 35 is journaled having a clevis 36 extending rearwardly near the upper end. A threaded connecting rod 37 attached to a piston (not shown) of the master cylinder 22 is held in the clevis 36 by a wrist pin 38. Lock nut 37a provides adjustment to increase or decrease free pedal travel to match wheel cylinder requirements to inching requirements; Arm 40 extends from the lower end of the crank arm 35 and projects laterally and forwardly therefrom to present a camming surface 42.

A fixed shaft 45 is secured by a set screw 46 into apertures 47 at each end of the legs 26, 27 upon which is journaled a one-piece rotatable pedal sleeve 49 which has joined at opposite ends thereof levers 50 on which the foot pedals 18 are attached. A dog 55, which projects rearwardly and upwardly from the pedal sleeve 49 carries a cam button 57 which is adapted to engage the camming surface 42 of the arm 40. Adjusting screw and nut 56 are provided to fix the pedal position to suit the operator within limits. A brake return spring 60 has one end hooked into the wrist pin 38 beneath the clevis 36 and at the opposite end is adapted to be anchored to a structural member such as a cowl 30.

Figure 3:
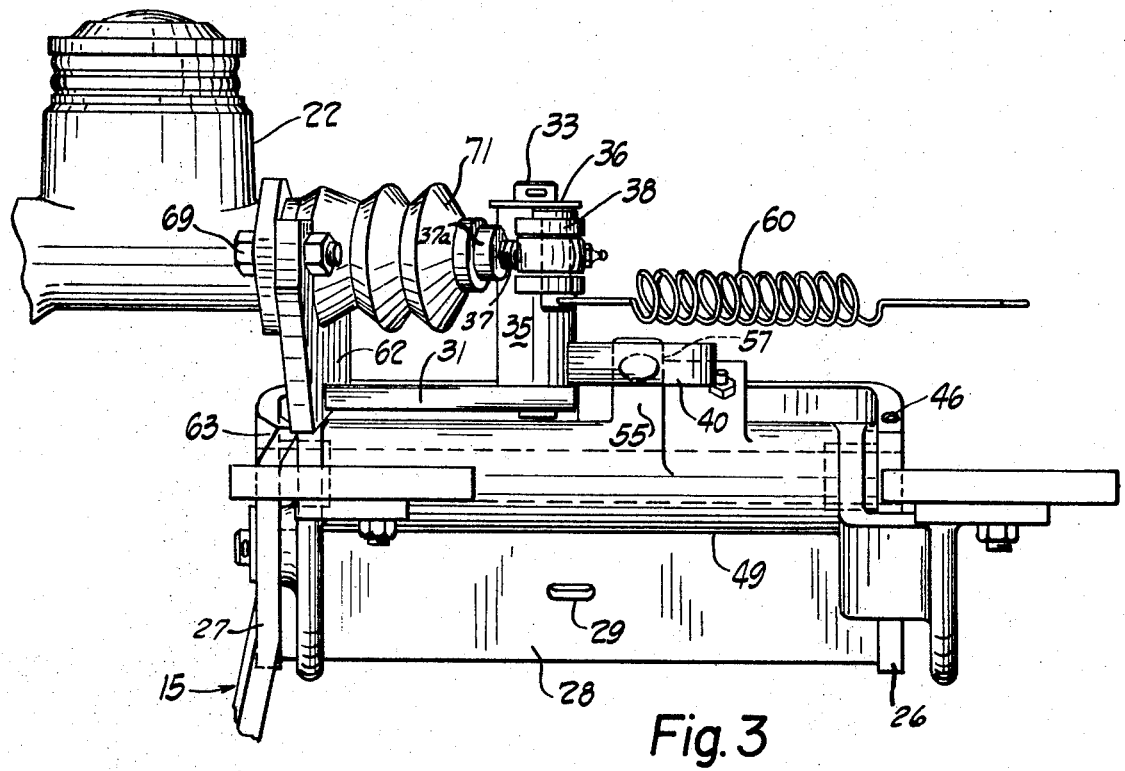
FIG. 3 is a front elevational view of the pedal mounting of FIG. 2.

A second portion 62 of the mounting bracket 25 is joined on the end of the bracket portion 31 near the leg 27 and between the web 28 and a small ear 63 (FIG. 3). The bracket portion 62 extends vertically and at an angle to the web 28 providing an upwardly open cutout 64 defined by mounting wings 65, 66 on each side to which are attached a boss 68 of the master cylinder 22 by means of fasteners 69 such that the connecting rod 37 of the master cylinder extends through the cutout 64 on an axis intersecting with the axis of the wrist pin 38. A hydraulic line 70 (FIG. 1) of the master cylinder 22 extends from the vehicle cab to the wheel cylinders 23 for operating the wheel brakes 24.

In accordance with the invention, the entire pedal mounting 16 is installed as one assembly by bolting the bracket 25 to the cowl 30 (FIG. 4). The brake system 20 is ready for operation simply by connecting up the hydraulic line 70 to the master cylinder. There is no separate intervening linkage rods, pins, etc. which must be assembled for connecting the brake pedals 18 as where, in the prior art, there is a remotely located master cylinder. Thus, the present invention greatly simplifies the assembly operation since the master cylinder and pedal mounting is combined. The mounting bracket 25 is constructed so that when bolted to the inside rear wall of the cowl 30, which slopes rearwardly at an angle, the bracket portion 31 is disposed in a horizontal plane (FIG. 4) so as to orient the crank arm 35 vertically. The bracket portion 62 is also oriented vertically so that when the master cylinder 22 is mounted on the wings 65, 66, it will be level both longitudinally along the axis of the connecting rod 37 and transversely thereto, thus maintaining the hydraulic fluid of the master cylinder level.

Figure 2:
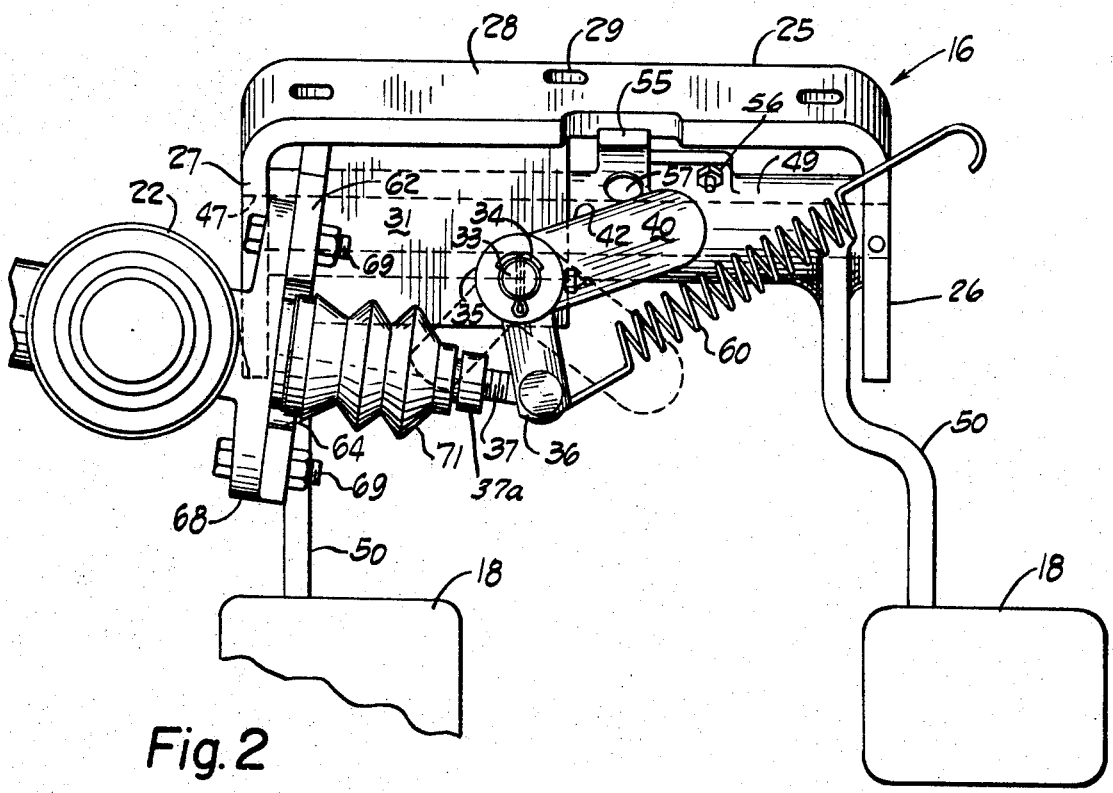
FIG. 2 is a plan view of the combined inching and brake pedal mounting illustrated in FIG. 1.

When the operator depresses the pedal 18, the one-piece pedal sleeve 49 rotates and swings the dog 55 rearwardly causing the cam button 57 to engage the camming surface 42 of the arm 40 rotating the crank arm 35 so as to reciprocate the connecting rod 37 of the master cylinder 22. The relative positions of the arm 40, clevis 36 and dog 55 upon full depression of the pedals 18 are depicted by dot-dash lines in FIGS. 2 and 4. The brake return spring 60 is further tensioned by rotation of the crank arm 35 and is effective for returning the pedals 18 to the position of brake disengagement when the operator releases his foot. The connecting rod 37 is substantially enclosed by a collapsible rubber sleeve 71 and is permitted a certain amount of lateral movement as required by the connection with the wrist pin 38. In reciprocating the connecting rod 37, the wrist pin 38 moves through an arcuate path which is parallel to the arcuate path taken by the arm 40 in moving from the position shown in full lines (FIG. 2) to the position shown in dot-dash lines and the degree of angular travel depends on the extent to which the pedals 18 are depressed in moving the dog 55. It will be seen that the arcuate path of the clevis 36 is in a direction transversely of the plane of movement of the dog 55 providing a more compact design.

The normal stroke of the master cylinder 22 is about three-quarters of an inch. Thus the inching control valve 14 is phased through the linkage 15 to disengage the clutches 13 when the brake 24 is engaged and vice versa with a zone of overlap in between providing for partial clutch and brake engagement during inching control, i.e., when it is desirable to have the truck creep in either a forward or reverse direction. In the preferred embodiment the pedal sleeve 49 is a one-piece construction. Thus pedals 13 are interconnected and are redundant to the system insofar as each is capable of performing the inching and braking function. The dual pedals provide flexibility of operation with either the left or right foot. It is important to note, however, that the linkage 15 may be connected to operate a standard friction clutch where the truck does not employ a power shift transmission 12 but instead has a manual shift transmission. In that event the invention provides that the pedal sleeve 49 is interchangeable with separate sleeves each to be integrally formed with a lever 50 and pedal 18 wherein the left pedal becomes the clutch pedal and the right pedal a brake pedal each relatively rotatable on the fixed shaft 45.

While the invention has been illustrated with reference to a particular pedal mounting especially designed for use in lift trucks, it further resides in the arrangement of parts and combinations which may suggest to a person skilled in the art other uses and possible modifications which are intended to be encompassed by the invention in its broadest aspects except wherein limited by the prior art.

I claim:

1. In a vehicle hydraulic brake system, a brake element, a wheel cylinder operatively connected to the brake element, a master cylinder having an operating piston reciprocally mounted therein and a hydraulic line extending from the master cylinder to the wheel cylinder for supplying hydraulic pressure in operating said brake element wherein the improvement comprises means for operating the master cylinder responsive to the braking requirements of the vehicle including:
  a. a mounting bracket;
  b. a foot pedal pivoted on the mounting bracket in a location accessible to the operator's feet;
  c. crank means for interconnecting the master cylinder piston and the foot pedal in a manner effective for converting the pivotal movement of the pedal in one plane of movement into a reciprocating movement of the piston in a plane transversely thereof; and
  d. spring means connected to said crank means for returning the master cylinder piston and foot pedal to the brake-disengaging position.

2. The improvement according to claim 1 wherein the mounting bracket comprises:
  a. a pair of parallel legs;
  b. a fixed shaft extending between the legs;
  c. said foot pedal rotatably mounted on the fixed shaft, and said crank means comprising;
  d. a dog rotated by the foot pedal in a longitudinal plane of movement; and
  e. a crank sleeve pivoted about a vertical axis having a projecting portion connected to said master cylinder piston and an arm angularly disposed relative to the projecting portion engageable with said dog for reciprocating said piston in a transverse plane of movement upon rotation of the pedal.

3. The improvement according to claim 1 wherein the vehicle provides a front cowl structure having an inside front wall which slopes rearwardly and upon which said mounting bracket is adapted to be attached, said bracket comprising:
  a. a web joining said legs across one end adapted to be secured to said wall;

b. a structural portion of said mounting bracket projecting from said web between the legs in a horizontal plane when said web is secured to the wall; and c. part of said crank means for producing reciprocating movement of the piston being rotatably mounted on said structural portion so that its pivot axis is vertically oriented when said mounting bracket is installed and other parts of said crank means responsive to pedal movement being rotatably mounted on a horizontal axis whereby a compact pedal mounting is provided.

4. The improvement according to claim 3 wherein the part of said crank means for producing reciprocating movement of the master cylinder piston comprises:

a. a shaft secured to said structural portion;

b. a crank sleeve rotatably mounted on said shaft having an upper projection portion formed thereon for pivotal connection to the master cylinder piston and projecting on a line intersecting with the axis of said piston;

c. an arm angularly disposed on said sleeve relative to the projecting portion and extending laterally thereof; and d. said other parts of said crank means responsive to pedal movement including; and e. a dog mounted in juxtaposition to said arm for rotation by said pedal about a horizontal axis.

5. The improvement according to claim 3 wherein the mounting bracket comprises:

a. master cylinder support portion extending outwardly from said web at an angle to said legs having a support surface oriented at right angles to the reciprocating axis of said master cylinder piston and establishing the transverse plane of movement of said piston relative to said crank means; and b. a mounting surface on said master cylinder engageable with said support surface.

6. The improvement according to claim 1 wherein the mounting bracket comprises:

a. a pair of parallel legs;

b. a fixed shaft extending between the legs; and c. a pedal shaft rotatably mounted on the fixed shaft and substantially coextensive therewith and pivotally supporting said foot pedal.

7. The improvement according to claim 6 wherein said foot pedal comprises:

a. dual pedal elements mounted at opposite ends of said pedal shaft so that either the left or right foot may be used to operate the brake.

8. The improvement according to claim 6 wherein said pedal shaft comprises:

a. a first shaft section engageable with said crank means and independently rotatable on said fixed shaft;

b. a second shaft section independently rotatable on said fixed shaft;

c. a brake pedal mounted on said first shaft section; and d. a clutch pedal mounted on the second shaft section for disengaging a clutch when said brake pedal is depressed.

9. In combination a brake pedal and master cylinder mounting bracket comprising:

a. a pair of parallel legs;

b. a fixed shaft extending between the legs;

a pedal shaft rotatably mounted on the fixed shaft;

d. a brake pedal connected to said pedal shaft and adapted to rotate it when the pedal is depressed;

e. a dog carried on the pedal shaft;

f. a crank rotatably mounted on the bracket having an arm engageable with said pedal dog for rotating the crank when the pedal is depressed; and g. spring means connected to said crank for returning the brake pedal.

10. The combination of claim 9 wherein said bracket comprises:

a. a web joining said legs across one end;

b. a structural portion of said mounting bracket projecting from said web between the legs in a substantially horizontal plane; and c. said crank being rotatably mounted on said structural portion so that its pivot axis is vertically oriented when said mounting bracket is installed.

UNITED STATES PATENT OFFICE
CERTIFICATE OF CORRECTION

Patent No. 3,575,063  Dated April 13, 1971

Inventor(s) Harley A. Harrom

It is certified that error appears in the above-identified paten and that said Letters Patent are hereby corrected as shown below:

Inventor's middle initial omitted on title page.

Column 2, line 16, after "shaft" -- , one -- has been omitt

Column 3, line 10, ";" should be -- . --.

Column 5, line 22, "and" should be omitted after sub-paragr d.

Column 6, line 21, "c." has been omitted at the beginning o the line.

Signed and sealed this 31st day of August 1971.

(SEAL)
Attest:

EDWARD M. FLETCHER, JR.  WILLIAM E. SCHUYLER, JR.
Attesting Officer  Commissioner of Patents